252-099.  XR  3562164  EX

United States Patent Office 3,562,164
Patented Feb. 9, 1971

3,562,164
PRODUCTION OF FREE FLOWING WASHING POWDER MIXTURES
Friedrich Bittner, Mozartstrasse 38, Bad Soden, Germany; Artur Schaller, Fritz-Roesslerstrasse 12, Rheinfelden, Baden, Germany; and Edmund Simmersbach, Haus Ne. 24, Willaringen-Egg, Kreis Sackingen, Germany
No Drawing. Filed Mar. 27, 1968, Ser. No. 716,333
Claims priority, application Germany, Mar. 25, 1967, D 52,634
Int. Cl. C11d 7/54
U.S. Cl. 252—95
6 Claims

ABSTRACT OF THE DISCLOSURE

Production of free flowing washing powder mixtures containing wash active substances, active oxygen containing substances, builders and other usual components, such as fillers and optical brighteners, by spraying a melt consisting of at least one compound forming a component of the washing powder mixture which is fusible in its own water of crystallization and which solidifies to a solid phase with excess water unto the upper portion of an upright chamber and blowing the remaining components of the mixture into the spray cone of the melt in the form of a solution, slurry or powder and permitting the resulting mixture to fall down through the chamber to form a granulate.

BACKGROUND OF THE INVENTION

The invention relates to an improved process for the production of free flowing washing powders which in essence consist of wash active substances, active oxygen containing substances, builders, such as soda, phosphates, cellulose glycolates, and other usual additions, such as fillers, optical brighteners and the like.

Spray drying or spray mixing processes are for the main part used for the production of washing powder mixtures consisting of a number of components in as homogeneous a mixture as possible. In spray mixing processes, the components except for the active oxygen containing compound are first processed to form a homogeneous slurry. The active oxygen containing compound is omitted because of the high temperatures required for the production of the slurry which would cause decomposition of the active oxygen containing compound. The slurry, after a certain ripening period, is then sprayed at elevated temperatures and relatively high pressures in a spray drier where it is freed from the added water with hot air. The light granulates formed thereby, namely, the so-called tower powders, are then mixed with the active oxygen containing substance, such as sodium perborate, in a separate step. Because of the difference in density of the two components there always is the danger of separation, especially during transportation of the powder mixture. Such separation is undesirable as in use of the washing powders local reductions in perborate concentration can lead to unsatisfactory results in washing. A further disadvantage of the spray drying process is the high incidence of dusts in the products which according to Seifen, Öle, Fette (91), No. 23, page 819, can make up about 6–12% of the sprayed material. In addition, the nature of the end product is very dependent upon a careful production of the slurry. The process furthermore requires considerable apparatus investments and considerable energy but, on the other hand, has the advantage that the quantities of the individual components, especially, the anionic surface active agents, and the water content can be varied as desired.

In the spray mixing process the necessity of the production of a slurry is avoided and in such process all powdered components including the sensitive active oxygen containing substances are mixed in special apparatus and sprayed simultaneously with liquids which contain the remaining components of the washing composition. It is essential in such process that the powdery consistency of the mass is retained during the entire process and therefore that the spraying is conducted in such a manner that the water is continuously taken up by the hydrate forming components of the mixture and an aggregation of the different particles takes place. Under some circumstances, special measures must be taken to remove the heat of crystallization and reaction in order to avoid decomposition of the active oxygen containing substance.

The production of products with constant bulk density, uniform particle size distribution and good free flowing properties which are retained, while avoiding lump formaton, is not easy and requires much experience and uniform starting materials. Also, the low bulk densities achieved in the spray drying process are not attained in the spray mixing process. In addition, the bonds between the individual particles produced by the hydration in the granulated product are comparatively weak so that the products have a low mechanical strength. Also, in carrying out the process difficulties are often encountered as deposits often occur on the mixing tools and the walls of the mixing apparatus which can be very detrimental to a continuous operation. Further disadvantages of the spray mixing process are the restrictions placed on the recipes which can be used and also that the finished packaged products have a tendency to give up moisture.

Attempts to improve the especially difficult homogeneous incorporation of the active oxygen containing substances which serve as bleaching agent and to lessen the danger of separation have not been lacking. For instance, according to German Pat. 739,417 powdered sodium perborate is sprayed into the spray cone of a solution of the wash active substances and the other components of the washing composition. However, in such process the particle size, particle shape and state of agglomeration of the perborate cannot be influenced so that the perborate particles must be bonded by the solid particles produced in the spraying of the other components and this is not always accomplished with certainty.

Attempts have also been made to spray solutions of the perborate and the slurry through separate nozzles in the same spray drier. In view of the high temperatures prevalent in the spray drier, premature thermal decomposition of the perborate cannot be reliably avoided. As a consequence, it is in general necessary to use perborate solutions of relatively low concentrations to avoid undesired losses in active oxygen so that a high active oxygen content in the washing composition cannot be achieved.

Up to the present the problem of providing a process for the production of a complete washing composition from all of its components in a single working step using a single spray mixing apparatus in a continuous process has not been satisfactorily solved.

SUMMARY OF THE INVENTION

According to the invention it was unexpectedly found that free flowing washing powder mixtures in the form of hard granules having no tendency to form lumps, which contain a homogeneous mixture of the individual components, can be produced if melts of compounds which melt in their water of crystallization and which also are capable of solidifying to a homogeneous solid phase in the presence of excess of water in the melt are sprayed into a tower and mixed with solutions, slurries or powders of the remaining components of the washing composition and such mixtures permitted to solidify as they drop down through the tower to form a granulated product which, if necessary, can subsequently be dried at moderately raised temperatures in the range of about 25 to 60° C. Preferably, water containing melts of sodium perborate are employed as the melts and preferably the remaining components of the washing composition are introduced into the spray of such melt in the form of a previously prepared powder product, preferably, the so-called tower powders, produced by spray drying a slurry of the various components involved.

DETAILED DESCRIPTION OF THE INVENTION INCLUDING PREFERRED EMBODIMENTS

According to the invention a water containing melt, preferably, of sodium perborate which serves as the active oxygen carrier for the washing composition is employed as the melt. The water content of this melt can be up to 45 wt. percent of the perborate corresponding to the formula $$NaBO_2 \cdot H_2O_2 \cdot 3H_2O$$

Very surprisingly, the decomposition of the perborate and therefore the loss in active oxygen is very slight in the process according to the invention despite the relatively high temperatures of 60 to 70° C. at which the perborate melt is sprayed, presumably because the time the perborate remains in the form of the melt is very short because of the continuous production of the melt and its immediate introduction into the spray tower. It was found that decomposition could be practically completely avoided according to a preferred embodiment of the invention when perborate melts are employed which have soluble compounds of magnesium, cadmium or zinc added thereto in quantities of 0.5–5% with reference to the perborate content.

The perborate melts which are employed according to the invention are advantageously prepared, for example, by continuously introducing about 7 weight parts of sodium perborate and about 3 weight parts of water to which 1 wt. percent of magnesium chloride has been added into a stirring vessel maintained at 90° C. Under the influence of intensive stirring, the perborate is transformed to a melt which is continuously drawn off at a temperature of about 60–70° C., in a quantity corresponding to the quantity of perborate and water supplied and immediately sprayed in the spray tower. According to another embodiment of the invention the melt can be produced from a solution of sodium metaborate and hydrogen peroxide with the addition of a water soluble magnesium salt as stabilizer. For instance, the melt can be prepared from a 39 wt. percent sodium metaborate and a 50 wt. percent hydrogen peroxide solution.

The wash active substances, such as an alkyl benzene sulfonate or fatty alcohol sulfate, can be admixed with the perborate melt in the form of their solutions just before it is introduced into the spray tower. However, it is also possible to introduce such wash active substances into the spray tower separately either in the form of solutions or preferably as a powder. The other components of the washing composition are also preferably introduced into the spray tower in the form of a powder. However, they also can be introduced in the form of a solution or dispersion. The other components of the washing composition need not be introduced into the spray tower as a mixture and they can also be introduced into the spray cone formed from the perborate melt either individually or in groups. Preferably, the remaining components of the washing composition, including the wash active substances, are blown into the spray cone formed from the preborate melt in the form of a previously prepared dry tower powder mixture.

It has been found to be of special advantage that it is possible to recycle the dust portion of the product produced according to the invention directly by blowing such dust into the perborate melt spray cone either together with the remaining components of the washing composition or separately.

As the components introduced into the spray tower fall down through the tower, they are not only mixed but also the various particles of the compounds are coated with the melt and upon hardening thereof are joined and build up to granules. According to previously known processes the formation of deposits on the walls of the fall chamber were highly undesired. Preferably, according to the invention the lower end of the fall chamber of the spray tower is conical and the walls of such conical portion, upon which build up a granulate particles can occur, are formed of flexible material, such as, for example, of polyethylene sheet material. The flexible walls can be periodically or continuously kept in movement, for example, with the aid of one or more beaters, vibrators or perforated annular rings, which can be movable in the direction of the axis of the fall chamber, through which air can be blown against the exterior of the flexible walls. The movement of the flexible walls causes the granulates deposited thereon to fall off so that they can be collected at the discharge opening at the lower end thereof and carried off, for example, with the aid of a conveyor belt. Depending upon the recipe and the water content of the material supplied to the spray tower, the granules formed during the passage through the fall chamber of the spray tower may or may not require a subsequent drying treatment at a temperature between about 25 and 60° C.

The following examples will serve to illustrate the process according to the invention.

EXAMPLE 1

6 liters per hour of a perborate melt which was obtained separately by melting together 7 weight parts of sodium perborate tetrahydrate and 3 weight parts of water and which left the melting vessel at 65° C., were supplied over a metering pump to a manifold to which simultaneously 7.2 liters per hour of a wash active substance primary ethyl sulfate solution with 20% by weight of water which has been preheated to 55° C. to improve its fluidity were supplied over a second metering pump. The mixture was sprayed with hot air through a two component nozzle into the upper end of a spray tower. 15.4 kg. per hour of a powder mixture consisting of 18.2% of sodium silicate, 45.4% of tetrasodium phosphate and 36.4% of sodium sulfate were blown into the spray cone formed by the perborate melt and wash active substance mixture through an inlet tube. Recycled dust which had been separated from the granular product produced was also introduced into the spray cone through a second inlet tube. The powdered substances were drawn into the cone by the suction of the latter so that they were well mixed with the perborate melt and wash active substance. Granulates were produced which continuously fell out of the bottom end of the spray tower, which, as previously described, had movable conical flexible walls, onto a conveyor belt on which they were dried at a temperature of 32° C. to a total active oxygen content of about 2%.

The end product had an active oxygen content of 1.94% which corresponds to a sodium perborate tetrahydrate content of 18.65%.

The bulk density of the product was 280 g./liter. It had good free flowing characteristics and its solution time was 60 seconds. Even after 12 months' storage the product was still free flowing.

After removal of the 5% of oversize granules the remaining 95% had the following sieve analysis, the active oxygen content of the individual fractions also being given:

| On mesh width in mm. | Portion in percent | Active oxygen in percent |
|---|---|---|
| 1.0 | 27 | 2.01 |
| 0.8 | 23 | 2.00 |
| 0.5 | 31 | 1.95 |
| 0.4 | 15 | 1.93 |
| 0.2 | 3 | 1.62 |
| 0.1 | 1 | |
| Remainder | 0 | |

The distribution of the components in the 1.0 mm. and 0.5 mm. sieve fractions was as follows:

| Component | On mesh width 1.0 mm., percent | On mesh width 0.5 mm., percent |
|---|---|---|
| $P_2O_5$ | 7.7 | 8.0 |
| $B_2O_3$ | 4.4 | 4.3 |
| $SiO_2$ | 8.5 | 9.0 |
| $SO_4$ | 14.1 | 15.1 |
| Active oxygen | 2.0 | 1.95 |
| $Na_2O$ | 15.1 | 15.1 |

EXAMPLE 2

The procedure of Example 1 was repeated except that the powdered components were not introduced into the spray cone as a mixture through one inlet pipe but rather individually through separate inlet pipes and that an propyl benzene sulfonate which was mixed with 50% of water and heated to 70° C. to render it sufficiently fluid was used as the wash active substance and 14.4 liters per hour of such mixture supplied to the spray nozzle. The product was dried at an air temperature of 50° C. The dried end product had an active oxygen content of 1.98%. Its bulk density was 290 g./liter and its free flowing properties were good and remained so after 12 months' storage. Its solution time was 65 seconds. 2% of oversized granules were produced. The remaining 98% were of the sieve analysis given below, the active oxygen content of the individual fractions also being given:

| On mesh width in mm. | Portion in percent | Active oxygen in percent |
|---|---|---|
| 1.0 | 21 | 1.99 |
| 0.8 | 24 | 1.93 |
| 0.5 | 39 | 1.97 |
| 0.4 | 13 | 1.90 |
| 0.2 | 3 | 1.42 |
| 0.1 | 0 | |
| Remainder | 0 | |

The distribution of the components in the 1.0 mm. and 0.5 mm. sieve fractions was as follows:

| Component | On mesh width 1.0 mm., percent | On mesh width 0.5 mm., percent |
|---|---|---|
| $P_2O_5$ | 7.65 | 7.58 |
| $B_2O_3$ | 4.45 | 4.30 |
| $SiO_2$ | 8.46 | 7.95 |
| $SO_4$ | 16.03 | 15.50 |
| Active oxygen | 1.99 | 1.97 |
| $Na_2O$ | 15.50 | 14.96 |

EXAMPLE 3

0.66 liter per hour of a sodium perborate melt produced from a 39% sodium metaborate solution and a 50% $H_2O_2$ solution with the addition of 1% of magnesium chloride as stabilizer were sprayed in a spray tower at 50° C. The molar ratio of active oxygen to $Na_2O$ was 0.99:1 and the melt contained 6.65% of active oxygen and therefore 35.4% more water than would correspond to sodium perborate tetrahydrate. 2.4 kg. per hour of a previously prepared dry tower powder mixture consisting of 21.4% of tripolyphosphate, 21.4% of sodium pyrophosphate, 28.6% of lauryl sulfate and 28.6% of sodium phosphate were introduced into the spray cone of the perborate melt. The agglomerates which were formed in the spray tower did not require further drying as the water introduced by the perborate melt was only 7.5% of the total mixture and was completely taken up. The perborate melt had almost uniformly distributed itself on the granules of the tower powder. The large granules had an active oxygen content of 1.85% and the smaller granules below 0.4 mm. had an active oxygen content of 1.75%. The bulk density of the product was 310 g./liter and the solution time thereof was 2.5 minutes.

The process according to the invention combines the advantages of the known commercial processes and in addition provides improvement in the solubility, hardness and free flowing characteristics of the granulates produced. The components which are sprayed in with the melt agglomerate with the other component blown into the spray cone of the melt and the agglomerated particles fall on the lower conical wall of the spray tower and there, at the latest, build up to granulates in that the coatings formed by the perborate melt adhere to each other and harden. If drying is effected after the granulates are removed from the spray tower the excess water is given off from the shells formed from the perborate melt so that they achieve a certain porosity. This results in a higher solubility rate. The solubility rate of the products produced according to the invention is considerably higher than that of the prior products in which the perborate content is fixed in the form of more or less compact crystals in the interior of the granules.

A further substantial advantage of the products according to the invention resides in their relatively high hardness and strength. The granulates have good free flowing characteristics and do not tend to form lumps. They also do not give up water to the ambient medium so that difficulties caused by penetration of such moisture through packaging materials is avoided. As can be seen from the examples, the bulk density of the products produced according to the invention can be as low as that of the products produced by the spray drying process. In contrast with the spray mixing process, the granulates which are formed are not subjected to mixing apparatus and therefore retain their original shape and structure. The recipe and particle size distribution of the end product can be varied within wide limits to meet the requirements of the consumer.

The spray tower employed in the examples was about 3 meters in diameter and the fall chamber thereof was about 6 meters high. The throughput of the spray tower could be increased to about 200 kg. per hour without overloading the fall chamber.

We claim:

1. In a process for the production of a free flowing washing power mixture containing a wash active substance, sodium perborate and other adjuvant materials, the improvement comprising the steps of spraying a melt of the sodium perborate component of the washing powder mixture which perborate is fusible in its own water of crystallization and which solidifies to a solid phase with excess water, into the upper portion of an upright chamber and blowing the remaining components of the washing powder mixture into the spray cone of the melt and permitting the resulting mixture to fall down through the chamber to form a granulate.

2. The process of claim 1 in which the melt which is sprayed contains sodium perborate and a quantity of water in excess of that corresponding to the formula $NaBO_2 \cdot H_2O_2 \cdot 3H_2O$, the excess quantity of water introduced into the chamber with the melt and the other components not being greater than 45% based on the weight of the sodium perborate calculated on the basis of said formula.

3. The process of claim 2 in which the melt is an aqueous melt containing sodium perborate in which the water content is not in excess of 45% based upon the weight of the sodium perborate calculated upon the basis of said formula and the remaining components are blown in in the form of a dry powder.

4. The process of claim 3 in which said melt consists essentially of sodium perborate and water.

5. The process of claim 3 in which said melt also contains a water soluble salt of magnesium, zinc or cadmium as a stabilizer in a quantity of 0.5 to 5 wt. percent based upon the sodium perborate.

6. The process of claim 3 in which the melt is prepared directly before spraying from sodium perborate tetrahydrate and water.

References Cited

UNITED STATES PATENTS

| 2,308,992 | 1/1943 | Mertens | 252—97 |
| 2,706,178 | 4/1955 | Young | 252—95X |
| 3,366,570 | 1/1968 | Slob | 252—99 |

MAYER WEINBLATT, Primary Examiner

U.S. Cl. X.R.

252—99